J. McINTYRE.
ROLLING SHUTTER.
No. 19,941. Patented Apr. 13, 1858.
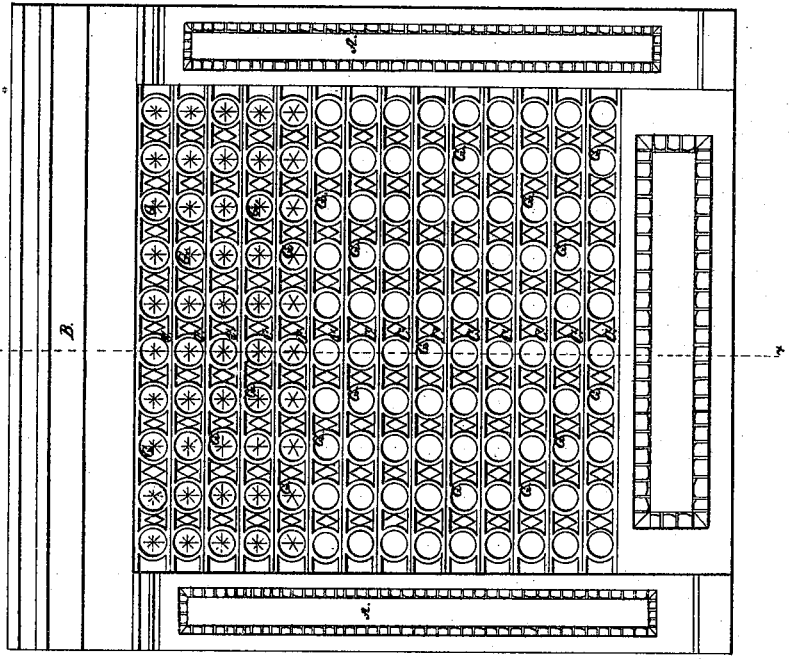
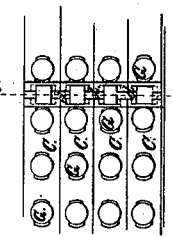
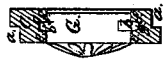
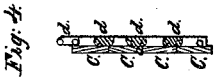
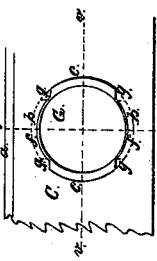
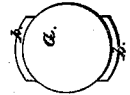
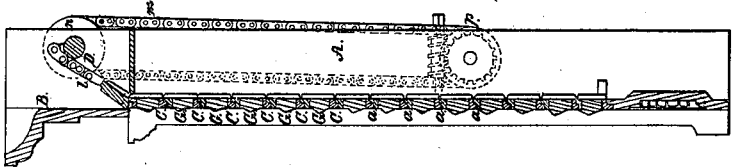

UNITED STATES PATENT OFFICE.

JAMES McINTYRE, OF NEW YORK, N. Y.

ILLUMINATING IRON ROLLING SHUTTERS.

Specification of Letters Patent No. 19,941, dated April 13, 1858.

*To all whom it may concern:*

Be it known that I, JAMES McINTYRE, of the city, county, and State of New York, have invented a new and useful Improvement in Rolling Shutters; and I do hereby declare that the following is a full, clear, and exact description of the same, reference being had to the accompanying drawings, forming part of this specification, in which—

Figure 1, is front view of a store front, fitted with a rolling shutter constructed according to my invention. Fig. 2, is a transverse vertical section of the same, in the plane indicated by the line $x$, $x$, Fig. 1. Fig. 3, is a back view of a portion of the shutter. Fig. 4, is a transverse vertical section of the portion of the shutter represented in Fig. 3, in the line $y$, $y$, of that figure. Fig. 5, is a back view of a portion of one slat on a larger scale, illustrating the method I generally employ to secure the glasses in place. Fig. 6, is a transverse section in the plane indicated by the line Z, Z, in Fig. 5. Fig. 7, is a section in the plane indicated by the line $v$, $v$, Fig. 5. Fig. 8, is a back view of one of the glasses detached.

Similar letters of reference indicate corresponding parts in the several figures.

This invention consists in the construction of a rolling shutter with its slats of iron and glass combined in such a manner as to render the shutter not only burglar-proof and fire-proof in the same degree as shutters made wholly of iron, but also sufficiently translucent to light the interior of a store, house, or office in the daytime, enough for many purposes, when it is not desired to open it; and likewise to expose to persons outside any fire that may take place therein at night, or any light that may be used by a thief who may have secreted himself in a store in daytime to wait for the closing of the store at night to commence "operations"; and at the same time as to permit the easy rolling up of the shutter, thus giving the shutter a combination of characteristics never before attempted in the construction of rolling shutters.

In Figs. 1 and 2, A A B, is the framing of the store front. D is the roller to which the shutter is attached by short chains $l$, $l$, and on which it rolls up; the said roller being operated by an endless chain $m$, running over a pulley $n$, at one end of it and another pulley $p$, which is worked by suitable handgear within the store.

C, C, are cast iron frames constituting the principal portions of the slats fitted together at their edges with rabbets shown at $a$, $a$, in Figs. 2, 4, and 6, so that each overlaps the one below it but that yet the general surface of the shutter may be flat and the ends of the shutter may fit snugly in narrow grooves provided for them in the jambs A, A. These cast iron frames C, C, may be of about the width usual for the slats of rolling iron shutters. They have apertures cast in them at suitable intervals apart, with proper seats around said apertures to receive the glasses G, G, which may be of flat, lenticular, prismatic or other form, either circular or polygonal, and may be secured in their seats by soft metal or cement. I prefer, however, to make the glasses of circular form, with a cylindrical exterior, but with two flange-like projections $b$, $b$, shown in Figs. 6 and 8, on opposite sides, each of the said projections extending about one-fourth of the way around the glass. The aperture to receive the said glass is of circular form in front and of a size to receive the cylindrical portion of the glass, and of similar form and size at the back, except that in the back part there are two recesses $c$, $c$, shown in Fig. 5, of a form and size to allow the projections $b$, $b$, on the glasses to enter; and in the middle between the front and back cylindrical portions $e$, and $f$, (see Figs. 5, 6, 7,) there is a groove $g$, all around the aperture to receive the projections $b$, $b$, on the glass. The glasses G, G, thus constructed are inserted from the backs of the frames C, C, by placing the projections $b$, $b$, opposite to the recesses $c$, $c$, and after dropping them into the apertures, turning them to bring said projections within the flange-like cylindrical portions $f$, $f$, of the back thereof, (as shown dotted in Fig. 5,) where they are held secure between the said flange-like portions and the flange-like front portions $e$, $e$, so that the glasses cannot be driven out. When the glasses have been thus inserted, the recesses $c$, $c$, are filled with soft metal or cement, (as shown tinted blue in Fig. 5,) which prevents the glasses being turned. This metal or cement being protected in front by the flange-like front portions $e$, $e$, of the apertures, cannot be picked out by burglars, and hence the glasses cannot be removed without breaking them in pieces.

The apertures and glasses should not be of too large size; as the smaller they are, the more difficult it would be for burglars to break them out.

The slats composed of cast iron frames C, C, fitted with glasses G, G, in the manner described, may be connected by chains attached to the backs or by a system of links d, d, (Figs. 3 and 4) which makes the slats themselves portions of the chains.

To provide in the fullest degree against burglary, the outer faces of the cast iron frames C, C, of the slats may be chilled in the casting, which will render it impossible to cut them by drills or other tools.

Instead of making the slat frames C, C, of cast iron, they may be made of wrought or sheet iron, and have apertures provided to receive cast or wrought iron sockets to contain the glasses which may be secured in said sockets in same manner as in the apertures of cast iron slat frames C, C, already described. The above mentioned sockets may be secured in the wrought iron slats by rivets or bolts or other fastenings applied so as to be protected on the outside of the shutter.

It is not absolutely necessary in order to obtain the results aimed at in this invention, that every slat in the shutter be furnished with glasses, but some of them may be made solid. I therefore wish my invention to be considered as including the construction of shutters with only certain of the slats of iron and glass.

I am aware that iron and glass have been combined in various ways for vault lights, windows, and other parts of buildings, and therefore I disclaim such combination for all other purposes than the slats of rolling iron shutters; but I am not aware that glass has ever been used in a rolling iron shutter, or that such a shutter has ever been made to possess the combination of characteristics herein mentioned.

I therefore claim as my invention, and desire to secure by Letters Patent,—

The construction of a rolling shutter with its slats of iron and glass combined substantially as herein described to obtain the characteristics herein specified.

JAMES McINTYRE.

Witnesses:
I. J. OLONE,
HENRY T. BROWN.